United States Patent
Ohsawa et al.

[11] Patent Number: 5,289,216
[45] Date of Patent: Feb. 22, 1994

[54] CAMERA WITH FILM INFORMATION SETTING DEVICE

[75] Inventors: Toshifumi Ohsawa, Tokyo; Jun Terashima, Kanagawa, both of Japan

[73] Assignee: Canon Kabushiki Kaisha, Tokyo, Japan

[21] Appl. No.: 2,110

[22] Filed: Jan. 4, 1993

Related U.S. Application Data

[63] Continuation of Ser. No. 716,639, Jun. 17, 1991, abandoned.

[30] Foreign Application Priority Data

Jun. 22, 1990 [JP] Japan .................. 2-165137
Jun. 22, 1990 [JP] Japan .................. 2-165138

[51] Int. Cl.$^5$ ............................... G03B 7/00
[52] U.S. Cl. ............................................. 354/21
[58] Field of Search ............... 354/21, 465, 471, 474, 354/475

[56] References Cited

U.S. PATENT DOCUMENTS 5,036,342 7/1991 Hoda et al. ................. 354/21
5,081,483 1/1992 Ishimura et al. ............ 354/412

Primary Examiner—Michael L. Gellner
Assistant Examiner—Howard B. Blankenship
Attorney, Agent, or Firm—Robin, Blecker, Daley & Driscoll

[57] ABSTRACT

In a camera having an exposure setting device which corrects exposure control automatically set according to a DX code, the setting device is arranged to automatically change the value of the set exposure value to a predetermined different value and to set the different value as the exposure value when the automatically set exposure value is at a predetermined specific value.

11 Claims, 5 Drawing Sheets

FIG.3(a)

| DX CODE | ISO TABLE I | ISO TABLE II |
|---|---|---|
| 1 1 1 0 1 | 25 | 25 |
| 1 1 1 1 0 | 32 | 32 |
| 1 1 1 0 0 | 40 | 40 |
| 0 1 1 0 1 | 50 | 50 |
| 0 1 1 1 0 | 64 | 64 |
| 0 1 1 0 0 | 80 | 80 |
| 1 0 1 0 1 | 100 | 100 |
| 1 0 1 1 0 | 125 | 125 |
| 1 0 1 0 0 | 160 | 160 |
| 0 0 1 0 1 | 200 | 200 |
| 0 0 1 1 0 | 250 | 250 |
| 0 0 1 0 0 | 320 | 320 |
| 1 1 0 0 1 | 400 | 400 |
| 1 1 0 1 0 | 500 | 500 |
| 1 1 0 0 0 | 640 | 640 |
| 0 1 0 0 1 | 800 | 800 |
| 0 1 0 1 0 | 1000 | 1000 |
| 0 1 0 0 0 | 1250 | 1250 |
| 1 0 0 0 1 | 1600 | 1600 |
| 1 0 0 1 0 | 2000 | 2000 |
| 1 0 0 0 0 | 2500 | 2500 |
| 0 0 0 0 1 | 3200 | 3200 |
| 0 0 0 1 0 | 4000 | 4000 |
| 0 0 0 0 0 | 5000 | 5000 |

FIG.3(b)

| DX CODE | ISO TABLE I | ISO TABLE II |
|---|---|---|
| 1 1 1 0 1 | 25 | 25 |
| 1 1 1 1 0 | 32 | 32 |
| 1 1 1 0 0 | 40 | 40 |
| 0 1 1 0 1 | 50 | 50 |
| 0 1 1 1 0 | 64 | 80 |
| 0 1 1 0 0 | 80 | 80 |
| 1 0 1 0 1 | 100 | 100 |
| 1 0 1 1 0 | 125 | 125 |
| 1 0 1 0 0 | 160 | 160 |
| 0 0 1 0 1 | 200 | 200 |
| 0 0 1 1 0 | 250 | 250 |
| 0 0 1 0 0 | 320 | 320 |
| 1 1 0 0 1 | 400 | 400 |
| 1 1 0 1 0 | 500 | 500 |
| 1 1 0 0 0 | 640 | 640 |
| 0 1 0 0 1 | 800 | 800 |
| 0 1 0 1 0 | 1000 | 1000 |
| 0 1 0 0 0 | 1250 | 1250 |
| 1 0 0 0 1 | 1600 | 1600 |
| 1 0 0 1 0 | 2000 | 2000 |
| 1 0 0 0 0 | 2500 | 2500 |
| 0 0 0 0 1 | 3200 | 3200 |
| 0 0 0 1 0 | 4000 | 4000 |
| 0 0 0 0 0 | 5000 | 5000 |

CAMERA WITH FILM INFORMATION SETTING DEVICE

This is a continuation application under 37 CFR 1.62 of prior application Ser. No. 716,639, filed Jun. 17, 1991, now abandoned.

BACKGROUND OF THE INVENTION

Field of the Invention

This invention relates to an improvement on the film information setting device of a camera which is provided with DX code reading means for reading a DX code recorded on a film cartridge and storage means for storing film information corresponding to the DX code read by the DX code reading means.

Description of the Related Art

The cameras of the kind arranged to read a DX code recorded on a film cartridge and to automatically set information about the film are already known.

In the conventional cameras of this kind, the automatically set film information is unconditionally determined by the DX code. Therefore, they have been incapable of satisfying the severe usage of professional cameramen or the like. For example, according to the automatic setting arrangement, the film sensitivity of a film A is set at a value ISO 64. Whereas, in some cases, more preferable colors are obtainable by setting it at ISO 80. In such a case, it has been necessary to manually change the automatically set film information as desired every time the camera is loaded with a film.

In cases where the photographer intentionally changes the automatically set film information after the film is loaded in the camera as mentioned above, the original film information might be forgotten later. To solve this problem, either a film-check window is provided in a part of the back cover of the camera to show a part of the film cartridge indicating the film information, or a memo holder is provided on the back cover. However, such reminding arrangement has resulted in a cost increase.

SUMMARY OF THE INVENTION

It is an object of this invention to provide a film information setting device for a camera arranged to automatically change film information automatically set by film information reading means to a desired value and to automatically set the changed value for the camera.

Under this object, it is one aspect of the invention to provide a film information setting device for a camera arranged to automatically change to a predetermined value a film information value which is automatically set by film information reading means when the film information value is a specific value and to automatically set the changed value for the camera.

Under the above-stated object, it is another aspect of the invention to provide a film information setting device for a camera which is arranged such that, when film information automatically set by film information reading means is manually changed, the value manually set is correlated with the automatically set film information and, after that, the film information is changed and set at the correlated value every time film information is automatically set by the film information reading means.

It is another object of this invention to provide a camera having manual setting means for changing by a manual changing operation a value of film information automatically set by film information reading means to a desired value and for setting the changed value for the camera and display means for displaying, independently of the value manually set by the manual setting means, the value automatically set before the manual changing operation.

These and further objects and features of this invention will become apparent from the following detailed description of an embodiment thereof taken in conjunction with the accompanying drawings.

BRIEF DESCRIPTION OF THE DRAWINGS

FIGS. 3(a) and 3(b) respectively show the correlations of DX codes to ISO tables I and II.

DETAILED DESCRIPTION OF THE PREFERRED EMBODIMENT

Figure 1:
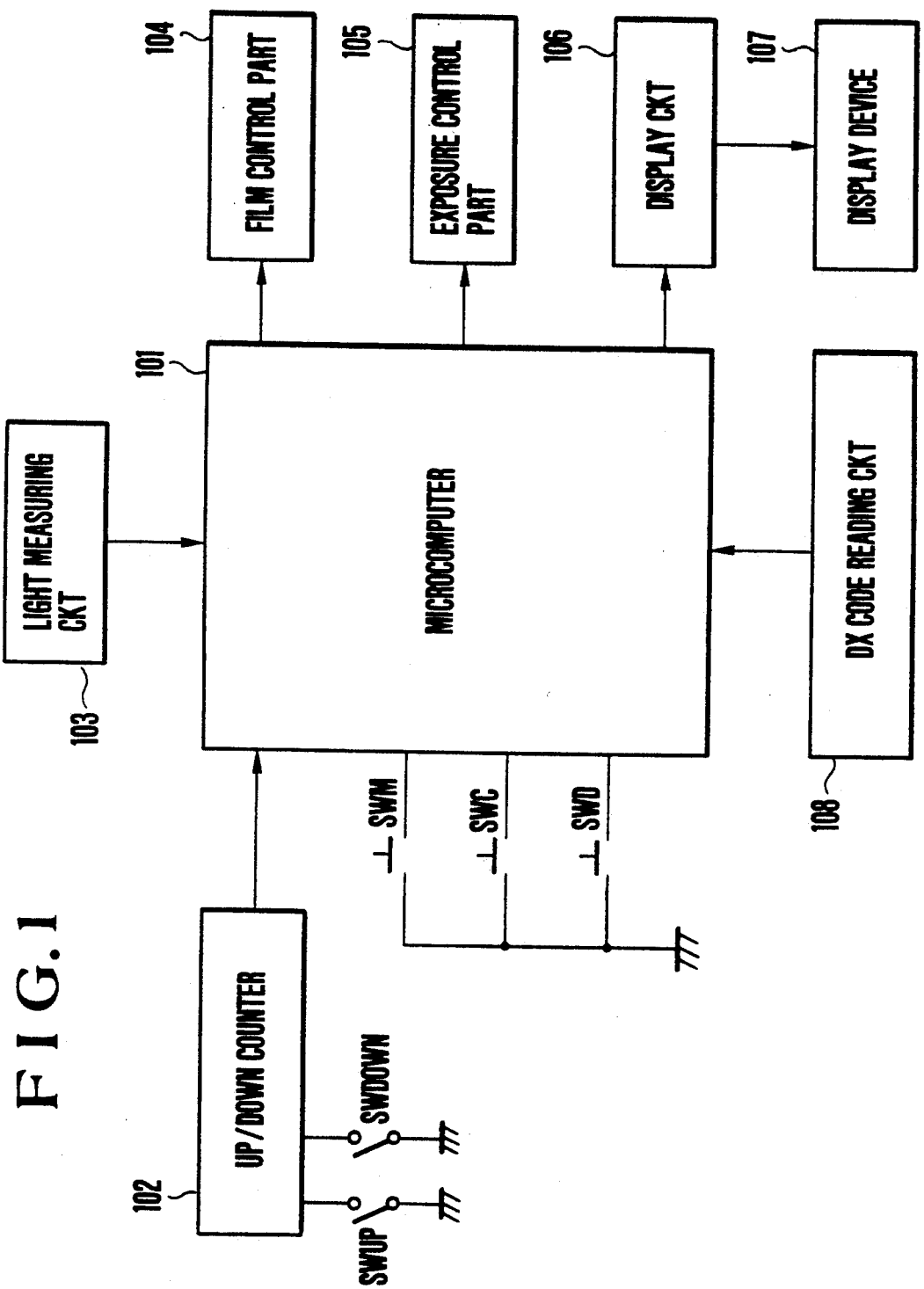
FIG. 1 is a block diagram showing an embodiment of this invention.

The following describes the details of this invention through an embodiment thereof with reference to the accompanying drawings:

FIG. 1 is a block diagram showing the arrangement of a camera which includes an embodiment of this invention. A microcomputer 101 is arranged to control the camera by performing a computing operation as required. An up/down counter 102 is arranged to permit information setting and is connected either to up/down operation buttons provided for setting information for the camera or to a rotary dial or the like which is arranged to generate two-phase pulses with a phase difference of 90 degrees. Up- and down-switches SWUP and SWDOWN are interlocked with these operation buttons. The counter 102 counts up or counts down when the up-switch SWUP or the down-switch SWDOWN turns on. A light measuring circuit 103 is arranged to obtain information on external luminance for exposure control of the camera. A film control part 104 is provided for film winding and rewinding, etc. An exposure control part 105 is provided for controlling a shutter and an aperture. A display circuit 106 is provided for causing a display device 107 to make a display. The display device 107 is disposed on the exterior of the camera. A DX code reading circuit 108 is provided for reading a DX code recorded on a film cartridge. A manual film sensitivity setting switch SWM, a DX code correction switch SWC and a DX code display switch SWD are connected to the microcomputer 101.

Figure 2A:
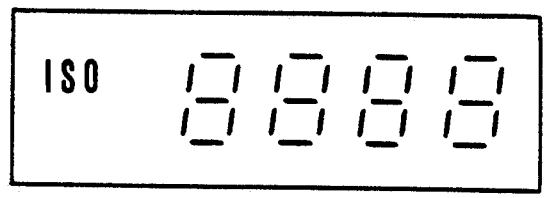
FIGS. 2(a), 2(b) and 2(c) show displays made by a display device shown in FIG. 1.
Figure 2B:
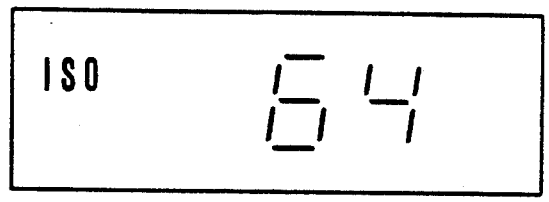
Figure 2C:
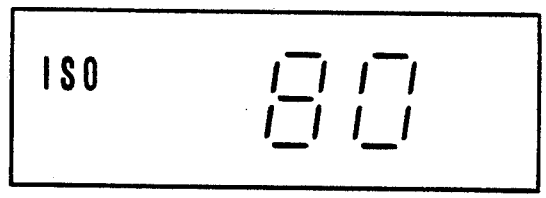

FIGS. 2(a) to 2(c) show the mode of displays to be made by the display device 107. The display device 107 is in a fully lit-up state in the case of FIG. 2(a). Some examples of film sensitivity information display are shown in FIGS. 2(b) and 2(c) as will be further described later.

FIGS. 3(a) and 3(b) show DX codes and conversion tables of ISO film sensitivity values.

It is widely known to arrange a camera to read a DX code recorded on a film cartridge and to automatically set an ISO sensitivity value and a photographable number of frames. Of these values to be set, correlation between the DX codes and the ISO values is as shown in FIGS. 3(a) and 3(b). FIG. 3(a) shows a set of DX codes in their initial state without correcting them at all.

FIG. 3(b) shows by way of example a table obtained after the set of DX codes has been corrected.

In each of FIGS. 3(a) and 3(b), the part of each DX code corresponding to an ISO (film sensitivity) value is expressed in a binary code of five bits. ISO values corresponding to the DX codes are indicated by an ISO table I in 24 steps including values "25" to "5000". Normally, a DX code is converted into an ISO value in a fixed ratio of 1:1 by the correlation table of "DX codes vs. ISO table I" as shown in the drawing. In the case of this embodiment, however, there is also provided an ISO table II in which any of ISO values is correctable to a value other than the standard ISO value of the ISO table I. The DX codes are thus arranged to be correctable as will be further described later herein. In an initial state in which the DX codes are not corrected at all, as shown in FIG. 3(a), the contents of the ISO table II is identical with those of the ISO table I. These ISO tables I and II are assumed to be written in an EEPROM.

Figure 4:
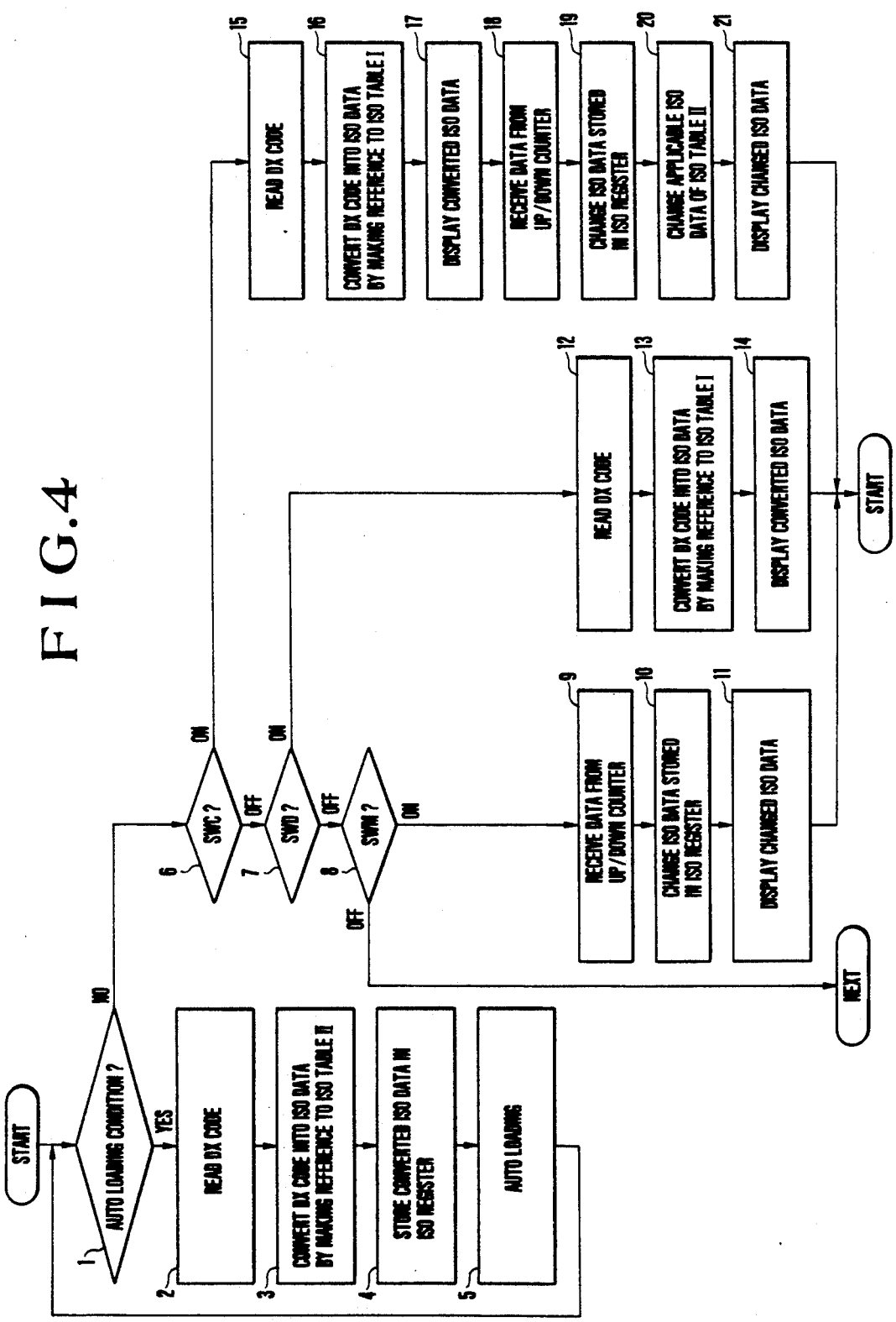
FIG. 4 is a flow chart showing the operation of the embodiment.

Referring to FIG. 4 which is a flow chart, the microcomputer 101 is arranged to operate as follows:

Step 1: The microcomputer 101 begins to operate, for example, when a power supply switch which is not shown is turned on. Then, a check is made to determine whether an automatic film loading operation is to be performed. For this purpose, the state of the back cover of the camera is detected to find if it has changed from an open state to a closed state with the film loaded. If the automatic film loading operation is thus determined to be necessary, the flow of operation proceeds to a step 2.

Step 2: A DX code recorded on the film cartridge is read by the DX code reading circuit 108 in a known manner. Step 3: The read DX code is converted into an ISO value by using the ISO table II of FIG. 3(a). Step 4: The ISO value data thus obtained by using the ISO table II is stored in an IS register which is disposed within the microcomputer 101. After that, exposure control, etc., are performed by using the ISO value data stored in the ISO register. Step 5: An automatic film loading operation is performed by rendering the film control part 104 operative. A loading completion flag is set up upon completion of the automatic film loading operation. Therefore, the loading completion flag remains in the set-up state after completion of the automatic film loading operation. The flow comes back to the step 1 after the automatic film loading operation.

Since the loading completion flag indicates that automatic film loading conditions are cleared, the flow comes from the step 1 to a step 6. Step 6: A check is made to find if the DX code correction switch SWC is in an on-state. If not, the flow proceeds to a step 7. At the step 7: A check is made to find if the DX code display switch SWD is in an on-state. If not, the flow proceeds to a step 8. At the step 8: A check is made to find if the manual film sensitivity setting switch SWM is in an on-state. If not, this means that the camera operation related to this invention has not been performed. In this instance, therefore, the flow of program proceeds to a next step. Meanwhile, if the switch SWM is found to have been turned on, the flow proceeds to a step 9.

At the step 9: A counted value is received from the up/down counter 102. In other words, in manually setting an ISO film sensitivity value, the switch SWM is turned on and, at the same time, the up-switch SWUP or the down-switch SWDOWN is operated to update the counted value of the counter 102. The thus-updated counted value of the counter 102 is supplied to the microcomputer 101.

At the step 10: The ISO value data stored in the ISO register is changed according to the counted value obtained at the step 9. The manual change of the ISO value is thus accepted. More specifically, the counted value read at the step 9 is added to the ISO value stored in the ISO register, and a sum thus obtained is newly written into the ISO register. Step 11: The changed ISO value data obtained at the step 10 is supplied to the display circuit 106 to be displayed by the display device 107.

The manual ISO value setting action is thus carried out through the above-stated steps 9 to 11. Further, the cycle of steps 1, 6, 7, 8, 9, 10 and 11 are repeated to continue the manual setting process as long as the switch SWM remains in its on-state. In a case where the DX code display switch SWD is turned on, the flow of program comes from the step 7 to a step 12.

At the step 12: The DX code recorded on the film cartridge is supplied from the DX code reading circuit 108. Step 13: The DX code supplied at the step 12 is converted into an ISO (film sensitivity) value on the basis of the ISO table I of FIG. 3(a). Step 14: The ISO value obtained at the step 13 is supplied to the display circuit 106 to be displayed by the display device 107.

Even in a case where the ISO value is manually set at ISO 80 through the steps 9 to 11 after the camera is loaded with a film cartridge of ISO 64, for example, the original film sensitivity value "ISO 64" can be temporarily displayed by pushing the DX code display switch SWD, as shown in FIG. 2(b). In this instance, it is only the original ISO value of the DX code that is displayed, and the ISO value stored in the ISO register for exposure control, etc., remains intact. Therefore, this obviates the necessary of setting the manually set value "ISO 80" all over again after confirmation of the DX code.

After completion of the action of the step 14, the flow of program comes back to the start thereof.

In a case where the DX code correction switch SWC is turned on, the embodiment operates as follows: In this case, the flow of program comes from the step 6 to a step 15. At the step 15: Information on the DX code is obtained from the DX code reading circuit 108. At a step 16: The DX code obtained at the step 15 is converted into an ISO value according to the ISO table I shown in FIG. 3(a). At a step 17: The ISO value obtained at the step 16 by conversion is supplied to the display circuit 106 to be displayed by the display device 107. Assuming that the DX code recorded represents a film sensitivity value "ISO 64", the display is made in a manner as shown in FIG. 2(b).

At a step 18: Like at the step 9 described in the foregoing, the microcomputer 101 obtains the counted data of the up/down counter 102 at which the counted value is changed and set. At a step 19: Like at the step 10, the ISO value stored in the ISO register is changed according to the counted value of the up/down counter 102.

In cases where an ISO value which is in storage within the ISO register happens to have been changed by the manual setting to a value different from the value of a DX code, it might cause confusion. To preclude it, the embodiment is arranged to cause an ISO value which is the same as a value represented by the DX code to be stored in the ISO register before the ISO value is changed by means of the up/down counted value. For example, when a count "+1" is supplied for a DX code of "ISO 64", data for "ISO 80" is stored in the ISO register.

At a step 20: A correction of the correlation "DX code vs. ISO table II" is carried out. More specifically, the ISO value of the ISO table II which corresponds to the DX code read at the step 15 is changed to the ISO value which is changed in the ISO register at the step 19. In this instance, a value "ISO 64" of the ISO table II which corresponds to the read DX code is changed to "ISO 80" as shown in FIG. 3(b). At a step 21: The data of the changed ISO value is supplied to the display circuit 106 to be displayed by the display device 107. Since the ISO value is changed to the value "ISO 80", in this instance, the display becomes as shown in FIG. 2(c).

After the ISO table II is changed at the step 20, in setting an ISO value by reading the DX code at the steps 2 to 4, reference is made to the ISO table II at the step 3. Therefore, in a case where another newly loaded film cartridge is recorded with a DX code representing the normal ISO value of "ISO 64", the ISO value of "ISO 80" is set as the ISO film sensitivity information data by making reference to the ISO table II of FIG. 3(b).

The DX code thus can be corrected in the above-stated manner. After the DX code correction, if the DX code display switch SWD is turned on, the steps 12 to 14 are executed in the manner described in the foregoing. Therefore, a display is made by converting the code according to the ISO table I regardless of the correction. This permits confirmation of the original ISO film sensitivity information on the display.

In this embodiment, the microcomputer is arranged to receive information on the operation of the DX code correction switch SWC and the counted value indicating the number of steps by which the DX code is corrected. Then, the film sensitivity information read by the DX code reading circuit 108 is converted in accordance with this counted value. The film sensitivity information obtained through the conversion process is stored in the memory. This arrangement enables the camera operator to change the ISO value to another ISO value as desired.

Further, the embodiment is arranged to cause a film information value corresponding to the original DX code and obtained before the conversion to be displayed on the display device 107 in response to the operation of the DX code display switch SWD. That arrangement effectively prevents any confusion from occurring as when the original film sensitivity information is forgotten by the camera operator.

While the embodiment has been described to be arranged to handle film sensitivity information as information on the film, the invention is not limited to this. In accordance with the invention, the arrangement may be changed, for example, to handle information on the number of frames or information on latitude.

What is claimed is:

1. A camera having a film information setting device, comprising:
   a) a film information reading circuit arranged to automatically read film information of a film loaded in the camera;
   b) a setting circuit for setting a data of value corresponding to the film information read by said film information reading circuit, said setting circuit setting a data of a first value when the read film information is a first information and a data of a second value when the read film information is a second information; and
   c) a modification circuit for modifying the correspondency of the data value to the film information set by the setting circuit, said modification circuit detecting the read film information and setting a data of a value different from the first value in the setting circuit when the read film information is the first information.

2. A camera having a film information setting device, comprising:
   a) a film information reading circuit arranged to automatically read film information of a film loaded in the camera;
   b) a data setting circuit for setting a data of a predetermined value corresponding to each of the film informations read by the film information reading circuit, said data setting circuit setting a data of a first value at least when the film information is a first information; and
   c) a modification circuit for modifying the relation between the read film information and the data value, said modification circuit detecting the film information read by the reading circuit and setting a data of a second value in the data setting circuit when the detected information is the first information.

3. A camera having a film information setting device, comprising:
   a) a film information reading circuit arranged to automatically read film information of a film loaded in the camera;
   b) a memory circuit having a plurality of memory portions, each portion having predetermined data memorized therein;
   c) a selection circuit for selecting a predetermined memory portion according to the film information read by the film information reading circuit;
   d) a setting circuit for setting the data of the memory portion selected by the selection circuit as data corresponding to the read film information; and
   e) a modification circuit for modifying predetermined data memorized in the memory portion.

4. A camera having a film information reading circuit arranged to automatically read a film information of a film loaded in said camera and to set a corresponding camera operating value and a manual information setting circuit arranged to set, in response to an operation of a manual operation member, a camera operating value to a desired camera operating value different from the camera operating value corresponding to the film information value read by said reading circuit, comprising:
   a) a display circuit arranged to display the camera operating value set by said manual information setting circuit;
   b) a display operation member arranged to be operated for causing said display circuit to display the camera operating value corresponding to the film information value read by said reading circuit after the desired camera operating value is set by said manual information setting circuit; and
   c) a control circuit for transmitting the information value set in the manual information setting circuit as an information for exposure control to an exposure control circuit portion even when the film information value read by the reading circuit is displayed by the display circuit insofar as the information is set in the manual information setting circuit.

5. A camera according to claim 2, wherein said data setting circuit includes a memory circuit having memory portions for memorizing data of different values, selects a predetermined memory portion according to the read film information, and sets the data memorized in the selected memory portion as a data corresponding to the film information, and the modification circuit has data modification means for modifying the data in the memory portion.

6. A camera according to claim 1, wherein the film information is ASA sensitivity.

7. A camera according to claim 2, wherein the film information is ASA sensitivity.

8. A camera according to claim 5, wherein the predetermined memory portion memorizes beforehand the data of the first value, and is selected when the film information is the first information, and the modification means modifies the data memorized in the predetermined memory portion to the data of the second value.

9. A camera according to claim 1, wherein said data setting circuit includes a memory circuit having memory portions for memorizing data of different values, selects a predetermined memory portion according to the read film information, and sets the data memorized in the selected memory portion as a data corresponding to the film information, and the modification circuit has data modification means for modifying the data in the memory portion.

10. A camera according to claim 9, wherein the predetermined memory portion memorizes beforehand the data of the first value, and is selected when the film information is the first information, and the modification means modifies the data memorized in the predetermined memory portion to data of a value different from the first value.

11. A camera according to claim 3, wherein the modification circuit designates a predetermined memory portion and modifies the data of the designated circuit to data of an optional value.

* * * * *